METHOD OF MAKING MAGNETIC TRANSDUCER HEADS

Filed June 4, 1956

INVENTORS
LEO J. EMENAKER
MARK M. SIERA
BY Byard G. Nilsson
ATTORNEY

United States Patent Office 3,000,078

Patented Sept. 19, 1961

3,000,078
METHOD OF MAKING MAGNETIC TRANSDUCER HEADS

Leo J. Emenaker and Mark M. Siera, Los Angeles, Calif., assignors to The Bendix Corporation, a corporation of Delaware Filed June 4, 1956, Ser. No. 589,188
4 Claims. (Cl. 29—155.5)

This invention relates to electro-magnetic transducer heads and to methods for forming such transducer heads.

According to one manner of recording an intelligence signal on a magnetizable record medium, the medium is passed across an electro-magnetic transducer head to impart variations in the degree of magnetization along the medium in accordance with the variations of the intelligence signal. Electro-magnetic transducer heads may include a core member formed of magnetic material and having a non-magnetic gap across which the magnetizable medium is caused to travel. The length of the non-magnetic gap in a core member is quite critical in various applications, and is ordinarily limited in length to a maximum of only a few 1000ths of an inch. A coil encircles the core member and as current flows through the coil, varying with the intelligence signal, proportionately varying magnetic field will be set up across the non-magnetic gap. As the medium is drawn across the non-magnetic gap, successive incremental portions thereof will be subject to different intensities of magnetic flux from the gap, thereby causing the medium to be magnetized along its length in accordance with the variations in the intelligence signal.

During the reproduction operation, the record medium is drawn across the same or a similar electro-magnetic transducer head in a like fashion. As each incremental portion of the medium passes across the non-magnetic gap, magnetic flux is produced in the core proportional to the degree of magnetization of that incremental portion. Thus, the flux in the core experiences variations with the passage of the medium and an intelligence signal is thereby induced in the coil encircling the core member.

In certain applications of magnetic recording, it is desirable to record several tracks; i.e., several intelligence signals upon one recording medium simultaneously. In such multi-track or multi-channel recording applications, a number of electro-magnetic transducer heads must be used either in a side-by-side arrangement or offset with respect to one another such as to act in conjunction with the different tracks.

In the past, one method of making electro-magnetic transducer heads of brittle magnetic material, e.g. ferrite, has been to form the core with two pieces of such material, each having a U-shaped configuration. The coil is then placed upon the U-shaped pole pieces and the U-shaped pieces are brought together to form one loop. The pole pieces at one junction are, ideally, brought into complete contact; however, the pole pieces at the other junction are separated by a non-magnetic gap. This gap may have been formed by placing a shim of non-magnetic material between the pole pieces.

In the process of making electro-magnetic heads, certain difficulties have been encountered in forming the non-magnetic gaps within tolerable size ranges for particular applications. In addition, some difficulty has been encountered in maintaining a firm contact between the pole pieces at which no non-magnetic gap is formed. Further, in multi-track applications, wherein a number of electro-magnetic heads were placed adjacent to one another, difficulty has been encountered in maintaining the gaps parallel with respect to each other. Among the purposes of maintaining a parallel relationship between the gaps is the desirability of maintaining proper phase relationships between intelligence signals.

According to the present invention, an electro-magnetic transducer head is formed with a core of brittle magnetic material by shaping a magnetic material into a closed ring or other apertured form. A coil is then placed upon the ring of magnetic material. A non-magnetic gap is then formed in the core by cutting an air gap in the ring. Several cores may be cut simultaneously to improve parallelism of the non-magnetic gaps with respect to each other. Inserts of magnetic material may then be placed in the non-magnetic gap to reduce the length of the gap, if required to satisfy the gap length requirements or to improve resistance to wear.

An object of this invention is to provide an improved process for making electro-magnetic transducer heads.

Another object of this invention is to provide an improved electro-magnetic transducer head.

Another object of this invention is to provide electro-magnetic transducer heads having improved magnetic gap qualities.

Another object of this invention is to provide electro-magnetic transducer heads having improved resistance to wear.

Another object of this invention is to provide a process for making electro-magnetic transducer heads more economically.

Another object of this invention is to provide a process of making a plurality of electro-magnetic transducer heads having more nearly uniform characteristics.

Other and incidental objects and features of this invention will appear from the following description with reference to the drawings in which.

Figure 1:
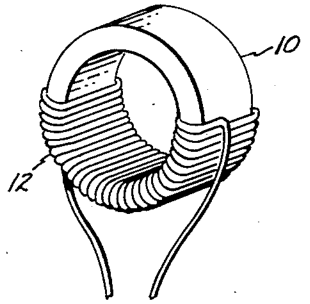
FIGURE 1 shows a step in the formation of an electro-magnetic transducer head in accordance with this invention.
Figure 2:
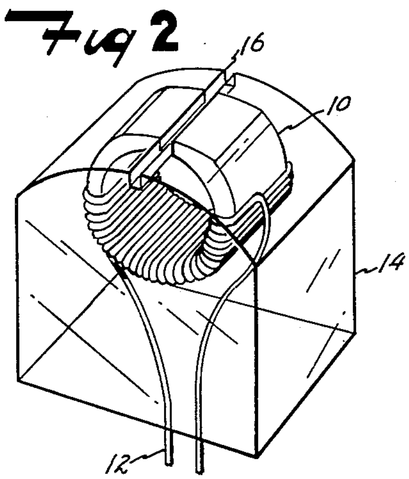
FIGURE 2 shows one electro-magnetic transducer head constructed in accordance with the principles of this invention.

There is shown in FIGURE 1 a core 10 of magnetic material. The core 10 may be formed into any apertured shape, such as the ring-shape in which it is shown. The material forming the core 10 may be any of the various brittle magnetic materials including ferrite. A coil 12 is wound upon the core 10 such as to pass through the aperture of the core 10. The unit as shown in FIGURE 1, including the core 10 and the coil 12, is then mounted rigidly as by being imbedded in a solidified plastic material to form a plastic block 14 as shown in FIGURE 2. The plastic block 14 may be cast of various solidifying materials including a material as epoxy resin. In imbedding the core 10 in the block 14, the core 10 is positioned adjacent to one surface of the block 14 as shown in FIGURE 2. The block 14 and the core 10 may then be lapped or cut to reduce the thickness of the core 10 at the surface of the block 14. The thickness of the core 10 may be so reduced to concentrate the flux of the core at this point.

A narrow slit or gap 16 is then cut i.e. abraded in the block 14 and the core 10. The width of this slit must be very closely controlled for most applications and limited to dimensions in 1000ths of inches. Several methods are available to cut the gap 16 including the following. A sawwheel may be formed of thin brass stock and revolved at a high speed to cut the gap 16 with the assistance of continuously applied diamond abrasive, Another method of cutting the gap 16 is by a moving wire as a band or jig saw, upon the block 10 also operated with diamond abrasive being applied.

Figure 3:
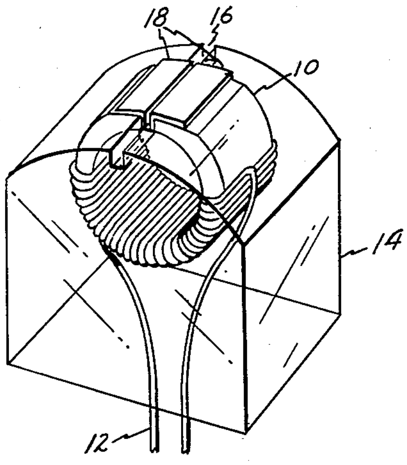
FIGURE 3 shows another electro-magnetic transducer head constructed in accordance with the principles of this invention.

In certain applications, the non-magnetic gap which can be cut in the core 10 may not be sufficiently narrow. In such applications, a magnetic head formed, as shown in FIGURE 3, may be used. FIGURE 3 shows a magnetic transducer head formed in a similar manner as the transducer head of FIGURE 2; however, the transducer head of FIGURE 3 is provided with a shorter non-magnetic gap. The shortened non-magnetic gap is provided by placing inserts 18 in the gap 16, as shown. The inserts 18 are formed of magnetic material, as supermalloy or alfenol for example, and, therefore, extend the length of the magnetic core 10 to effectively reduce the length of the non-magnetic gap. It is to be noted that the inserts 18 lap over the core 10 to prevent non-magnetic gaps from being formed between the inserts 18 and the pole pieces of the core 10 against which they are positioned, which will interfere with the desired gap.

The inserts 18 may also be provided to improve the wearing characteristics of the head. That is, as the magnetic medium is drawn across the head, wear will take place; however, if the inserts 18 are made of a wear-resistant material, as those named above, wearing characterics may be improved. This is particularly advantageous when the magnetic core of a head is formed of a material which is not wear resistant.

The magnetic gaps 16 shown in FIGURES 2 and 3 may be provided with additional inserts of non-magnetic material. These inserts fill the empty portions of gaps 16 and are formed of non-magnetic material as brass, thereby serving to position the inserts 18 in FIGURE 3, and to maintain the non-magnetic gap in the transducer heads by preventing magnetic material from accumulating therein.

Figure 4:
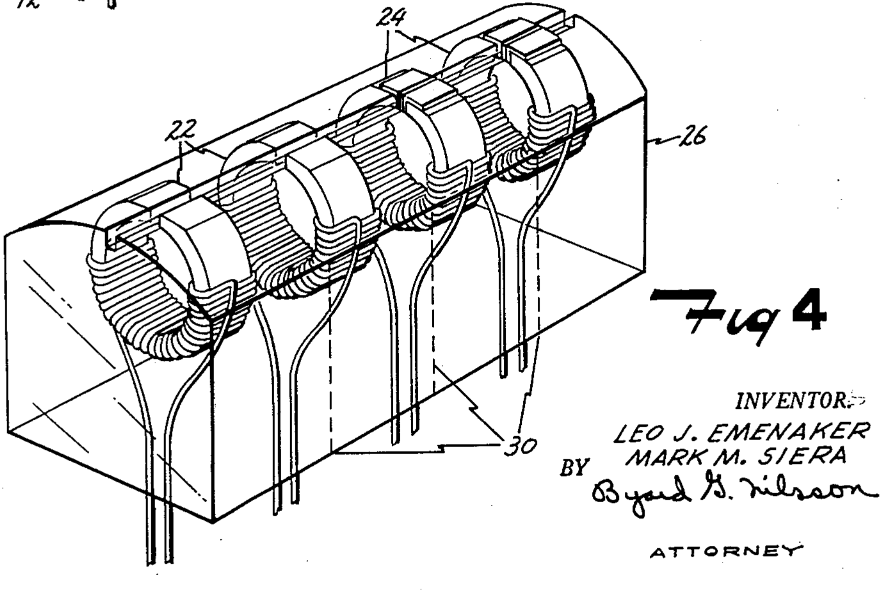
FIGURE 4 shows a plurality of electro-magnetic transducer heads constructed in accordance with the principles of this invention.

In multi-track applications, it is necessary to mount a number of transducer heads adjacent to each other to form a single transducer unit. Such a unit is shown in FIGURE 4 and includes transducer heads 22 formed in accordance with the method described with respect to FIGURE 2; and transducer heads 24 formed by the method described with reference to FIGURE 3. In the formation of a unit, as shown in FIGURE 3, a number of cores are rigidly mounted, as within a plastic block 26. The surface of the block adjacent the cores may then be lapped to reduce the size of the cores adjacent thereto, and thereby concentrate flux in the cores at this surface. Non-magnetic gaps are then cut in all of the heads 22 and 24 in a single cutting operation to provide gaps in each of the cores. It is to be noted that the individual gaps cut in the heads 22 and 24 in this manner will be more nearly parallel with respect to each other than might be possible in other construction processes. Magnetic inserts are then placed in the gaps of the heads 24 to provide magnetic gaps of reduced length for certain applications, and the remaining gaps in the heads are filled with non-magnetic material.

In certain manufacturing applications, it may be desirable to form single transducer heads by forming a unit as described with respect to FIGURE 4, and cutting the block 26 at the planes established by lines 30, for example, into separate units each containing at least one transducer head as shown by FIGURES 2 and 3.

Although for the purpose of explaining the invention, particular embodiments thereof have been shown and described, obvious modifications will occur to a person skilled in the art and this invention is not to be limited to the exact details shown and described.

What is claimed is:

1. A method of making a magnetic transducer head having a core of brittle material with a transducer gap therein and having a winding around the core at a location away from said transducer gap, which comprises the steps of: forming a closed loop of brittle magnetic material; placing a winding upon the closed loop of brittle magnetic material; casting said loop in a block of hardenable non-magnetic material so that said closed loop is adjacent to one surface of said block at a location away from said winding; and abrading a groove in said block so as to provide a non-magnetic, flux gap in said loop whereby to form said transducer head.

2. A method of making a magnetic transducer head having a core of brittle material with a transducer gap therein and having a winding around the core at a location away from said tranducer gap, which comprises the steps of: mounting a winding upon a closed loop of brittle magnetic material; casting said loop in a block of hardenable non-magnetic material so that said closed loop is adjacent to one surface of said block at a location away from said winding; and abrading a groove in said block so as to provide a non-magnetic, flux gap in said loop whereby to form said transducer head.

3. A method of making a magnetic transducer head having a core of brittle magnetic material, with a transducer gap therein and having a winding around the core at a location away from said transducer gap, which comprises the steps of: mounting an electrical winding upon a closed loop of brittle ferrite magnetic material; casting said loop of magnetic material in a block of hardenable non-magnetic material so that said closed loop is adjacent to one surface of said block at a location away from said winding; grinding away a portion of said block including a portion of said loop whereby to reduce the thickness of said loop; abrading a groove in said block so as to provide a flux gap in said loop whereby to form said transducer head.

4. A method of making a magnetic transducer head having a core of brittle magnetic material with a transducer gap therein and having a winding around the core at a location away from said transducer gap, which comprises the steps of: mounting an electrical winding upon a closed loop of brittle ferrite magnetic material; casting said loop of magnetic material in a block of hardenable non-magnetic material so the said closed loop is adjacent to one surface of said block at a location away from said winding; abrading a groove in said block so as to provide a non-magnetic gap in said loop; and affixing inserts of magnetic material in said groove to partially close said non-magnetic gap.

References Cited in the file of this patent

UNITED STATES PATENTS

| | | |
|---|---|---|
| 359,205 | Curtis | Mar. 8, 1887 |
| 2,334,584 | Rich | Nov. 16, 1943 |
| 2,382,857 | Camilli | Aug. 14, 1945 |
| 2,469,444 | Roys | May 10, 1949 |
| 2,484,568 | Howell | Oct. 11, 1949 |
| 2,487,091 | Barnes | Nov. 8, 1949 |
| 2,511,962 | Barnes | June 20, 1950 |
| 2,635,399 | West | Apr. 21, 1953 |
| 2,653,189 | Camras | Sept. 22, 1953 |
| 2,715,659 | Ibuka et al. | Aug. 16, 1955 |
| 2,754,569 | Kornei | July 17, 1956 |
| 2,760,314 | Heibel | Aug. 28, 1956 |

FOREIGN PATENTS

| | | |
|---|---|---|
| 807,725 | Germany | July 2, 1951 |